(12) United States Patent
Webber

(10) Patent No.: US 8,931,802 B2
(45) Date of Patent: Jan. 13, 2015

(54) VARIABLE VOLUME AIRBAG

(75) Inventor: James Webber, Shelby Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/560,295

(22) Filed: Jul. 27, 2012

(65) Prior Publication Data

US 2014/0028006 A1    Jan. 30, 2014

(51) Int. Cl.
*B60R 21/16* (2006.01)

(52) U.S. Cl.
USPC .................. 280/743.2; 280/743.1

(58) Field of Classification Search
USPC ............ 280/732, 731, 743.2, 743.1
See application file for complete search history.

(56) References Cited

U.S. PATENT DOCUMENTS

| | | | | |
|---|---|---|---|---|
| 5,308,113 A * | 5/1994 | Moriset | ...... | 280/743.2 |
| 5,558,365 A | 9/1996 | Oe et al. | | |
| 6,749,217 B2 * | 6/2004 | Damian et al. | ...... | 280/734 |
| 6,932,885 B1 * | 8/2005 | Oka | ...... | 156/345.55 |
| 7,264,268 B2 * | 9/2007 | Ehrke | ...... | 280/729 |
| 7,651,130 B2 * | 1/2010 | Bauberger | ...... | 280/743.2 |
| 7,654,561 B2 | 2/2010 | Webber et al. | | |
| 7,789,421 B2 * | 9/2010 | Issler et al. | ...... | 280/743.2 |
| 7,845,681 B2 * | 12/2010 | Abe et al. | ...... | 280/743.1 |
| 7,922,200 B2 | 4/2011 | Webber et al. | | |
| 7,938,445 B2 * | 5/2011 | Smith et al. | ...... | 280/743.2 |
| 7,954,850 B2 | 6/2011 | Fischer et al. | | |
| 8,020,890 B2 | 9/2011 | Webber | | |
| 8,191,925 B2 * | 6/2012 | Williams | ...... | 280/739 |
| 8,226,118 B2 * | 7/2012 | Rose et al. | ...... | 280/743.2 |
| 2007/0040368 A1 | 2/2007 | Manley | | |
| 2007/0132222 A1 * | 6/2007 | Thomas et al. | ...... | 280/743.2 |
| 2008/0252054 A1 | 10/2008 | Kim et al. | | |
| 2009/0218796 A1 | 9/2009 | Webber et al. | | |
| 2010/0225094 A1 | 9/2010 | Rose et al. | | |
| 2010/0259035 A1 | 10/2010 | Webber | | |

FOREIGN PATENT DOCUMENTS

| | | |
|---|---|---|
| EP | 0819072 B1 | 6/2002 |
| EP | 2017141 A1 | 1/2009 |
| JP | 07-329665 | 12/1995 |
| JP | 07-329697 | 12/1995 |
| WO | 2007022147 A2 | 2/2007 |
| WO | WO2007145028 A1 | 12/2007 |

OTHER PUBLICATIONS

Written Opinion & International Search Report for PCT/US13/052218, mailed Oct. 28, 2013, 13 pages.

* cited by examiner

*Primary Examiner* — Toan To
(74) *Attorney, Agent, or Firm* — Ralph E Smith

(57) ABSTRACT

In at least one implementation, a variable volume airbag includes an inflatable cushion and a tether coupled to the cushion. The inflatable cushion defines an inner volume in which a gas is received to inflate the cushion longitudinally and laterally within a passenger compartment of a vehicle, and has laterally opposed side surfaces defining part of the inner volume of the cushion. The tether is coupled to each of the side surfaces of the cushion and has a first state wherein the tether limits lateral separation of the side surfaces and a second state wherein increased separation of the side surfaces is permitted as compared to the first state.

19 Claims, 4 Drawing Sheets

VARIABLE VOLUME AIRBAG

FIELD

The present disclosure relates to an air bag for a vehicle.

BACKGROUND

Many automotive vehicles include airbags that are inflated during a vehicle collision. The airbags may include vents or other devices designed to control the inflation and deflation of the airbags and resulting interaction with a vehicle occupant. Occupants wearing a seat belt and those that are not wearing a seat belt can present different challenges in designing an airbag to reduce peak forces or loading on an occupant during a vehicle collision.

SUMMARY

In at least one implementation, a variable volume airbag includes an inflatable cushion and a tether coupled to the cushion. The inflatable cushion defines an inner volume in which a gas is received to inflate the cushion longitudinally and laterally within a passenger compartment of a vehicle, and has laterally opposed side surfaces defining part of the inner volume of the cushion. The tether is coupled to each of the side surfaces of the cushion and has a first state wherein the tether limits lateral separation of the side surfaces and a second state wherein increased separation of the side surfaces is permitted as compared to the first state. In at least certain implementations, the tether is in its first state upon initial inflation of the cushion to limit lateral expansion of the airbag, which in the case of a front airbag is cross-car expansion of the bag. When a threshold force acts upon the tether, the tether may change to its second state which permits greater lateral expansion of the airbag.

A variable volume airbag as set forth herein may also include an inflatable cushion defining an inner volume in which a gas is received to inflate the cushion longitudinally toward a vehicle occupant, and laterally and vertically within a passenger compartment of a vehicle. The cushion has laterally opposed side surfaces, opposed upper and lower surfaces, and front and rear surfaces facing an occupant and defining part of the inner volume of the cushion. A tether is coupled to each of the side surfaces of the cushion and has a first state wherein the tether limits lateral separation of the side surfaces and a second state wherein increased separation of the side surfaces is permitted as compared to the first state. The tether being coupled to the airbag closer to the front surface than the rear surface of the airbag, and closer to the upper surface than the lower surface. Upon initial inflation, a portion of such an airbag may engage or be engaged by an upper torso and head of a vehicle occupant sooner than an airbag without a tether arranged in this manner. The earlier interaction with an occupant may enable a longer longitudinal distance of engagement with the occupant to more effectively distribute and dissipate occupant energy and reduce peak forces on the occupant. This may be effective for both belted and unbelted vehicle occupants.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
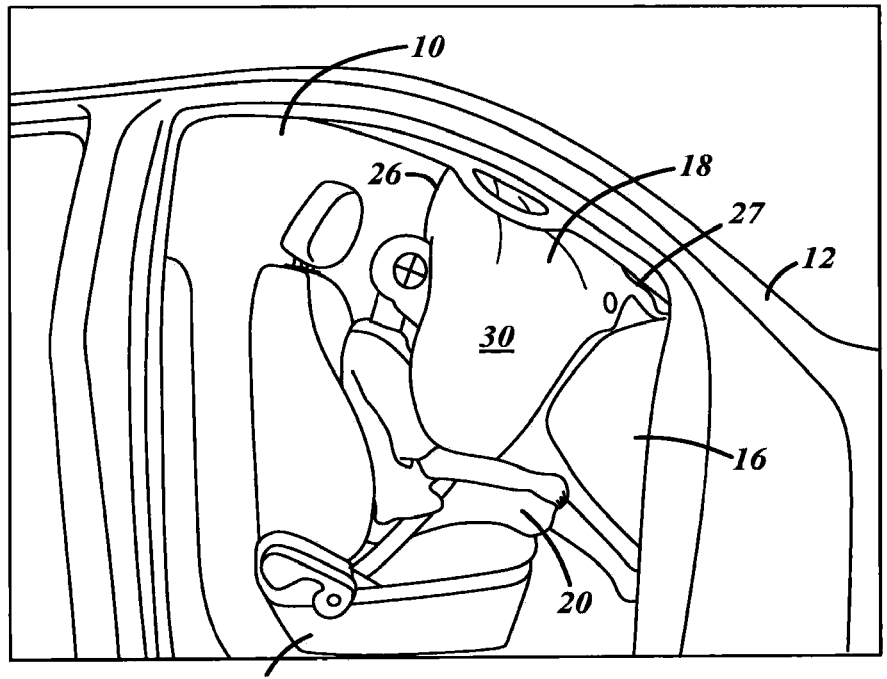
FIG. 1 is side view of a portion of a vehicle showing a portion of a passenger compartment, a modeled passenger and an airbag in an inflated state.
Figure 2:
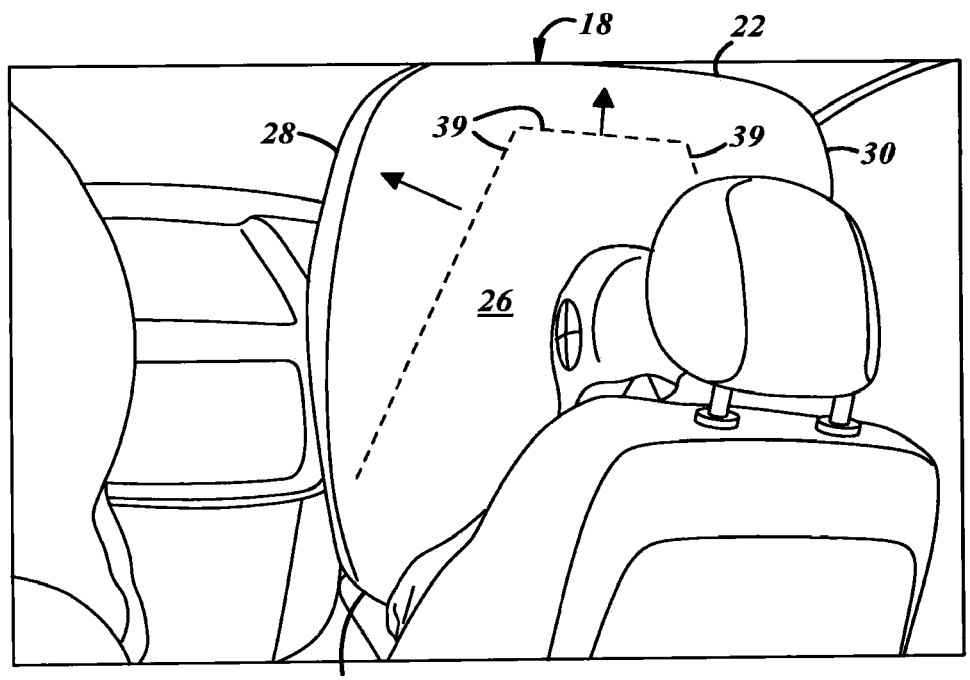
FIG. 2 is a perspective view taken from behind a front passenger seat of the vehicle illustrating the airbag of FIG. 1 in a fully inflated state.

Referring in more detail to the drawings, FIGS. 1 and 2 illustrate part of a passenger compartment 10 for a vehicle 12 including a seat 14 (shown here as a passenger seat as opposed to a driver's seat), dashboard 16, and an inflated cushion (commonly called an airbag 18) into which an occupant 20 has moved, such as may occur during a vehicle accident. In the illustrated example, the airbag 18 is contained within the dashboard 16 prior to inflation and extends outwardly into the passenger compartment 10 when inflated. For ease of description and reference in this patent application, the direction from the front to the rear of the vehicle, generally parallel to the straight ahead forward movement of the vehicle, will be called longitudinal, and the direction perpendicular to longitudinal between the driver's side door and passenger side door will be called lateral or cross-car. With this in mind, upon inflation the airbag moves both longitudinally toward one or more vehicle occupants (as best shown in FIG. 1) and laterally to provide a wider lateral dimension for engaging the occupant(s) (as best shown in FIG. 2). As shown in both FIGS. 1 and 2, the airbag also expands vertically as it inflates, which is generally the direction between a roof and floor of the passenger compartment.

The airbag 18 may be formed from conventional materials and methods to provide the above noted 3-dimensional cushion when inflated, and to facilitate orderly receipt within a housing prior to inflation. The airbag 18 may be considered to have an upper surface 22 generally facing the vehicle roof, lower surface 24 generally facing the vehicle floor, front surface 26 generally facing an occupant of the vehicle, a rear surface 27 facing away from the occupant, and opposed side surfaces 28, 30 generally facing the opposed driver's and passenger's sides of the vehicle. The airbag 18 may be comprised of one or more panels that may be formed from any suitable material and connected, if necessary, in any suitable manner, including stitches or a heat seam/weld, by way of two non-limiting examples. The various surfaces 22-30 or panels define a generally hollow interior or inner volume 32 (FIGS. 3 and 6) of the airbag 18 which receives a gas to cause the airbag to expand and become inflated. The surfaces 22-30 of the airbag 18 need not be planar or generally flat and even a spherical airbag can be considered to have the noted upper, lower, front, rear and side surfaces. Suitable vents may be provided as is known in the art, to control the inflation and deflation speed and energy of the airbag.

Figure 3:
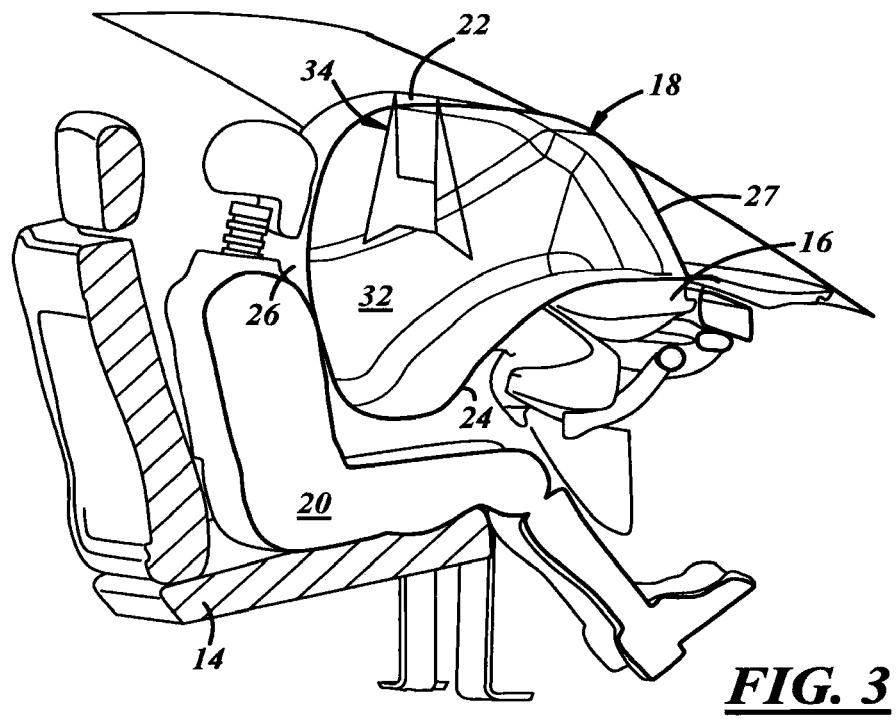
FIG. 3 is a side sectional view of a portion of the passenger compartment, modeled passenger and airbag showing an inner volume of the airbag and an internal tether.
Figure 4:
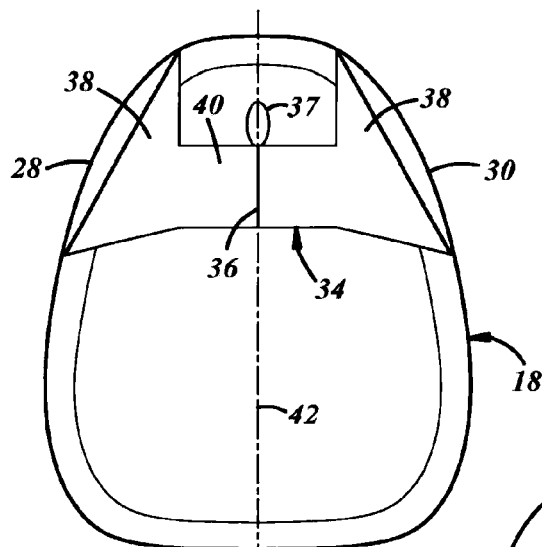
FIG. 4 is a front view of the airbag of FIG. 3 showing the tether in its first state.
Figure 5:
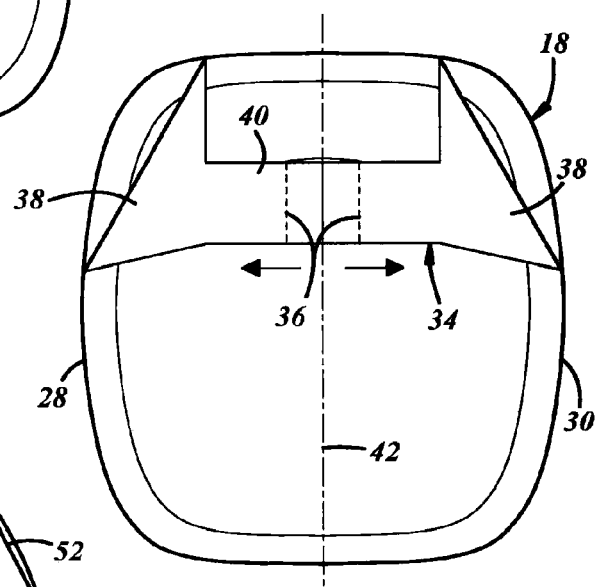
FIG. 5 is a front view of the airbag showing the tether in its second state.

As best shown in FIGS. 3-5, the airbag 18 may include one or more tethers 34 that are connected to one or more panels or surfaces 22-30 of the airbag to control at least the initial deployment and inflation of the airbag. As shown in FIGS. 3-5, a tether 34 extends between and is connected to at least the side surfaces 28, 30 of the airbag so that the tether extends laterally or cross-car. In a first or installed state, as shown in FIG. 4, the tether 34 has a length, which may be called its first length, that is less than the distance between the side surfaces 28, 30 to which the tether is connected if the airbag 18 were fully inflated without any tether. In this way, the tether 34 restrains, at least initially, the laterally outward inflation of the airbag 18. In doing so, the airbag 18 tends to inflate longitudinally into the passenger compartment 10 sooner than it otherwise would. This limits or delays maximum lateral inflation of the airbag 18 in favor of earlier longitudinal inflation of the airbag toward the occupant(s).

The earlier longitudinal inflation of the airbag 18 improves the interaction of the airbag with a vehicle occupant 20, particularly an occupant that is not using a seat belt, or is not securely fastened to the seat by a seat belt. The improved interaction between the airbag 18 and occupant 20 results in the occupant being coupled to the airbag sooner after a collision which results in a longer longitudinal restraint distance. The longer distance, which is the distance over which the occupant is coupled to or in contact with the airbag, allows occupant energy to be dissipated with lower peak forces. The lower peak forces result in lower reactive forces on the occupant and improved scores during vehicle safety testing such as vehicle frontal impact testing in the case of a front airbag as shown in the drawings. Of course, a similar tether 34 can be employed in airbags other than front airbags where inflation other than toward the occupant 20 is delayed by the tether 34 to encourage inflation of the airbag toward the occupant. In the example of a side airbag, the lateral direction may be considered to be from the front to the rear of the vehicle, which is the direction called longitudinal in the example of a front passenger airbag as shown herein. Further, in the example of a side airbag, the longitudinal direction may be considered to be between the driver side door and passenger side door. In this way, lateral restraint of the airbag will encourage longitudinal inflation toward the occupant.

The tether 34 may also have a second state that provides a lesser restriction of the separation of the side surfaces 28, 30 of the airbag 18, as shown in FIG. 5, where the lesser restriction may include no restriction at all. To provide the second state, the tether 34 may increase in effective length to a second length that is greater than the first length, or the tether may tear partially, or the tether may tear completely into more than one piece, or the tether may separate from the airbag 18. In the instance where the tether 34 achieves a second length, the second length may be greater than the maximum distance between the side surfaces 28, 30 at the points of attachment of the side surfaces to the tether so that the tether provides essentially no restriction to the movement of the side surfaces similar to a fully torn tether or a tether separated from the airbag. To achieve the second length, a portion of the tether 34 may be folded or pleated and attached to itself by a connection feature 36, creating a loop 37 of material, that may release when a force above a threshold is experienced by that portion of the tether. This is shown in FIG. 2 by imaginary lines 39 that show the general shape of the airbag 18 when the tether 34 is in its first state which are inward of the periphery of the airbag shown with the tether in its second state.

In the embodiment shown, the tether 34 includes enlarged end sections 38 that increase the length of the connection between the tether 34 and airbag 18, and has a reduced length connecting strip 40 extending between the end sections 38. All of the tether sections may be formed from the same piece of material without any seams, welds or stitches between the sections, if desired. The end sections 38 may be connected to the airbag 18 in a generally vertical orientation (when the airbag is inflated and while the tether remains connected to the air bag) or at an angle to the vertical orientation including perpendicular to vertical. In at least some implementations, the ends of the tether 34 are connected to the airbag 18 in a vertical orientation or at any angle relative to vertical. Further, the end sections 38 may be connected to the airbag 18 along the upper half of the airbag relative to the full vertical dimension of the airbag, that is, closer to the upper surface 22 than the lower surface 24. In this way, the airbag 18 primarily limits lateral expansion of the airbag in the region of the head, neck and upper torso of an average height occupant. And the tether 34 may be connected to the airbag along the longitudinal center of the airbag, or it may be connected to the airbag spaced from the longitudinal center although the volume reduction achieved may be less. In the implementation shown in FIGS. 1 and 2, the tether 34 is shown as being connected to the airbag along the longitudinal outer half of the airbag which is to say it may be connected closer to the front surface 26 than the rear surface 27.

To achieve the second state of the tether 34, the connection feature 36 or folded or pleated portion of the tether may be frangible, at least in part, to release the folded, pleated or looped length of the tether when the connection feature breaks, rips or tears. Also or instead, one or more points of connection between the tether 34 and the airbag 18 may be frangible, at least in part, so that at least one end of the tether may be released from the airbag when sufficient force acts upon the tether. Further, the tether 34 itself may tear under sufficient force without or in addition to tearing away from the airbag 18 or breaking of any connection feature 36.

Figure 7:
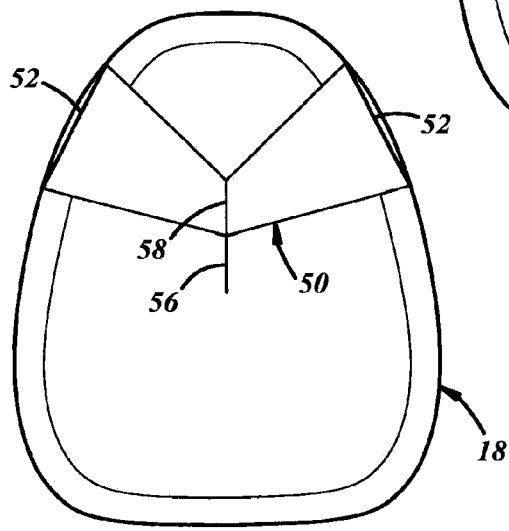
FIG. 7 is a front view of the airbag of FIG. 6 showing the tether in its first state.

For repeatability in a production run of airbags and in different airbag designs, the transition of the tether 34 from its first state to its second state should be repeatable at a desired threshold force or force range (so that the force characteristics of the airbag can be controlled), uniform (so that the airbag shape may be better managed during inflation and occupant interaction) and not destructive to the airbag's performance and operation. In this way, it may be desirable for any pleats or folds to be provided along a lateral centerline 42 of the airbag 18, as shown in FIGS. 4 and 7, so the side surfaces 28, 30 of the airbag move generally uniformly, the lateral shape of the airbag is not unduly distorted and good lateral coverage of the adjacent portion of the passenger compartment 10 may be achieved. Or, pleats/folds may be provided evenly spaced on either side of the centerline 42 or otherwise along the tether 34, again so that the airbag side surfaces 28, 30 move generally uniformly.

The force at which the tether 34 changes from its first state to its second state depends upon the strength of the connection feature 36 or component that breaks, tears or separates in use. Where there are threads that break or tear, the material of the threads may be less strong than the material of the tether 34, and the materials of the tether and threads may be chosen to provide a desired connection for a given application. This may enable the threads to tear without significantly damaging the tether 34 or airbag 18. The arrangement (location, number, etc.) of the threads may be provided to cause certain threads to break or tear before other threads break or tear to further control the release of the tether and inflation of the airbag and further improve the repeatability of the design. In this way, a progressive or more gradual tear may be achieved during airbag inflation to avoid a sudden and abrupt expansion of the inner volume 32 of the airbag 18. The controlled tearing may also enable a more uniform expansion of the airbag 18 so that each side 28 and 30 expands outwardly in the same general manner and at about the same time to avoid skewing or twisting of the airbag 18 as it inflates. Further, by changing the material of the stitches and/or tether 34, the tear strength can be easily changed.

Figure 8:
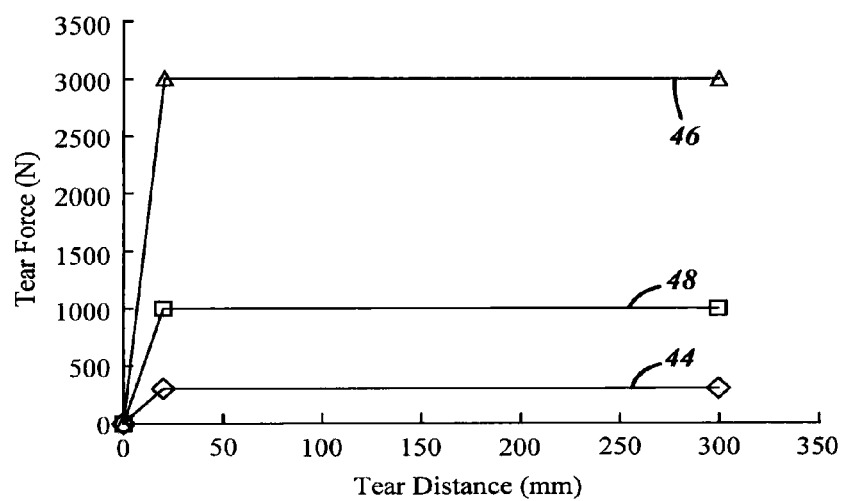
FIG. 8 is graph of tear force versus tear distance for tethers of different widths.

FIG. 8 illustrates several representative plots of tear force v. tear distance, where tear distance is the length of a stitched seam to be torn. This graph shows that the tear force can be varied between, for example without limitation, 250N and 3,000N where a lesser force may be associated with a narrower tether, shown by line 44, and a higher force may be associated with a wider tether, shown by line 46, with a mid-width tether shown at line 48. Also, in the illustrated examples of FIG. 8, the tear force remains constant, or nearly so, for most or all of the tear distance.

Figure 6:
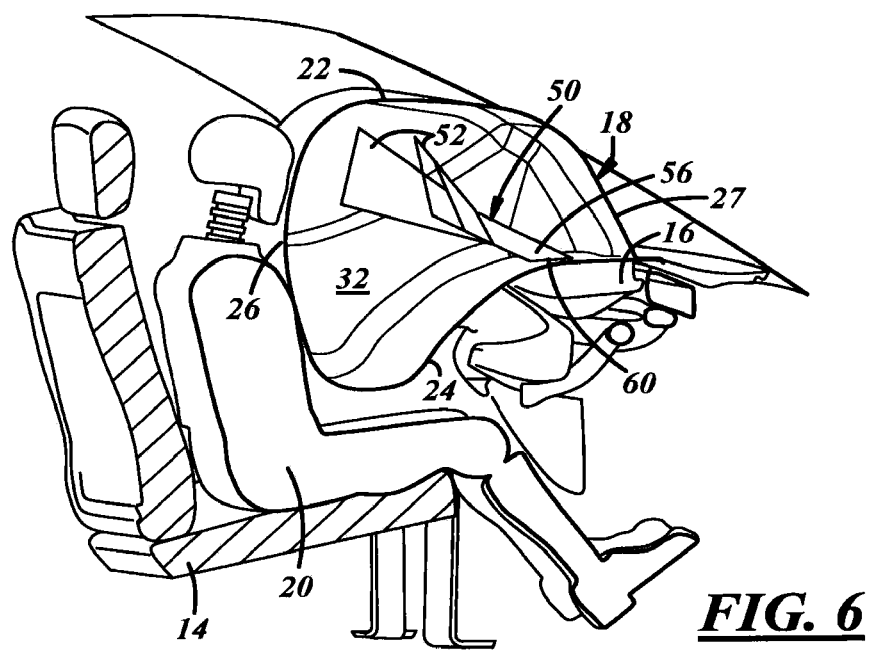
FIG. 6 is a side sectional view of a portion of the passenger compartment, modeled passenger and airbag showing an inner volume of the airbag and another internal tether.

FIGS. 6 and 7 illustrate a second of many possible tether configurations that may be used to initially limit cross-car expansion of an airbag. In FIGS. 6 and 7, the tether 50 is generally Y-shaped having spaced apart ends 52 that are each attached to a separate one of the opposed sides 28, 30 of the airbag 18, and a stem 56 that may be connected to the lower 24 or rear 27 walls of the airbag, for example. The tether 50 may be formed from a single, continuous strip of material that has been folded and provided with a seam or connection feature 58 attaching two sections of the tether material to form the stem 56 when the tether is in its first state. In its first state, the tether 50 initially limits lateral or cross-car expansion of the airbag 18, as shown in FIG. 7. Like the connection feature 36 discussed with regard to the tether 34 of FIG. 3, the connection feature 58 of the tether 50 may also be breakable to permit the two sections of material to separate when the tether 50 is acted upon by a sufficient force so that the tether 50 changes to its second state and increased lateral expansion of the airbag 18 is permitted. In its second state, the tether 50 may be V-shaped if the tether remains connected to the airbag 18 or airbag module at the base 60 of its stem 56, which is not required. If the stem 56 of the tether 50 disconnects from the airbag 18 or module, the distance between the ends 52 of the tether may increase without tearing of any seam 58 at the top of the stem 56. The connection feature 58 (e.g. threads, weld, etc.) could extend along all or part of the length of the stem 56 and could provide for a progressive, zipper-like tear or separation of the layers of material of the stem 56, of some other controlled separation of the layers of material, as desired.

Figure 9:
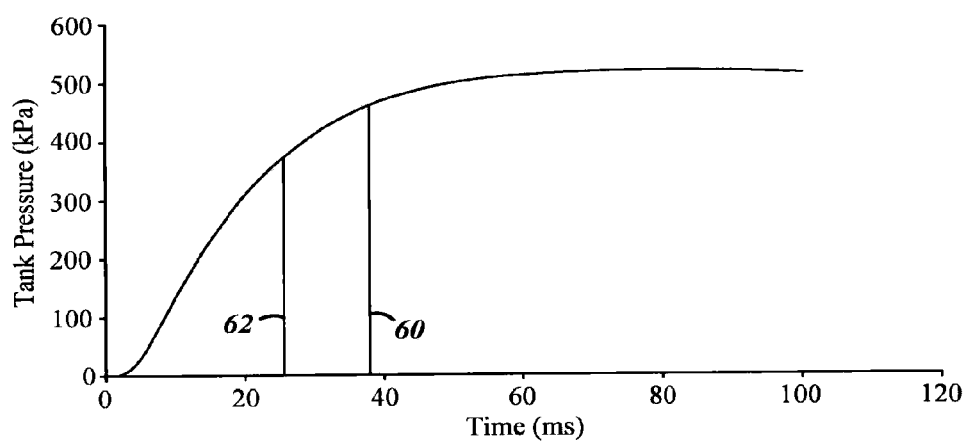
FIG. 9 is a graph of tank pressure versus time showing a representative airbag inflation curve.

Accordingly, upon initial inflation of an airbag 18 with a tether 34, 50 in its first state, the lateral or cross-car expansion of the airbag is limited. This may restrict the effective volume of the airbag 18 by up to 40%. In one implementation, the airbag volume is restricted by about 20-25%. For example, with an airbag 18 having a maximum volume of 125 cubic liters, the volume when the tether 34, 50 is in its first state may be limited to about 100 liters. When the airbag 18 is filled to its restricted volume, the tether 34, 50 may change to its second state, allowing increased outward expansion and permitting the airbag to achieve is maximum internal volume. As noted above, the initial restriction on lateral expansion enables the airbag 18 to expand toward an occupant more quickly. And with the tether 34, 50 limiting expansion in the upper half of the airbag 18, this causes the upper half of the airbag to expand toward an occupant 20 more quickly. FIG. 9 includes a representative graph of inflation/tank pressure versus time showing that conventional airbags provide a full deceleration of an occupant head at about 38 milliseconds after initiation of airbag inflation, as shown by line 60. The reduced volume airbag with tether as described herein provides a full deceleration of an occupant head at about 28 milliseconds, or 10 milliseconds sooner, as shown by line 62.

In addition to interacting with an occupant 20 sooner, which can improve energy absorption from occupants wearing a seat belt and particularly those not wearing a seat belt, the limited outward expansion also enables use of an airbag 18 with a greater longitudinal length (longer front to back). This deeper or longitudinally longer airbag 18 allows greater travel when engaged with an occupant 20 to improve the energy absorbing characteristics of the airbag 18 and reduce peak loads on the occupant. To further improve the energy loading characteristics, the airbag 18 may include conventional venting arrangements.

What is claimed is:

1. A variable volume airbag, comprising:
  an inflatable cushion defining an inner volume in which a gas is received to inflate the cushion longitudinally and laterally within a passenger compartment of a vehicle, the cushion having laterally opposed side surfaces defining part of the inner volume of the cushion; and
  a tether coupled to each of the side surfaces of the cushion and having a first state wherein the tether limits lateral separation of the side surfaces and a second state wherein increased separation of the side surfaces at the points of attachment of the side surfaces to the tether is permitted as compared to the first state.

2. The airbag of claim 1, wherein the airbag includes an upper half that is closer to the vehicle roof than a lower half of the airbag and the tether is coupled to the side surfaces along at least a portion of the upper half of the airbag.

3. The airbag of claim 1, wherein when the tether is in its first state the effective inner volume of the airbag is at least 15% less than the effective inner volume of the airbag when the tether is in its second state.

4. The airbag of claim 3, wherein when the tether is in its first state the effective inner volume of the airbag is up to 40% less than the effective inner volume of the airbag when the tether is in its second state.

5. A variable volume airbag, comprising:
  an inflatable cushion defining an inner volume in which a gas is received to inflate the cushion longitudinally and laterally within a passenger compartment of a vehicle, the cushion having laterally opposed side surfaces defining part of the inner volume of the cushion; and
  a tether coupled to each of the side surfaces of the cushion and having a first state wherein the tether limits lateral separation of the side surfaces and a second state wherein increased separation of the side surfaces is permitted at the points of attachment of the side surfaces to the tether as compared to the first state wherein the tether includes a frangible connection feature that breaks when the tether is subjected to a force above a threshold to permit the tether to change from its first state to its second state.

6. The airbag of claim 5, wherein the connection feature includes one or more stitches in the tether.

7. The airbag of claim 6, wherein the stitches connect together two layers of material of the tether.

8. The airbag of claim 6, wherein the stitches connect together the tether and airbag.

9. The airbag of claim 5, wherein the connection feature is a seam formed between two layers of material of the tether.

10. The airbag of claim 1, wherein the airbag includes an outer half that is closer to a vehicle seat than an inner half of the airbag and the tether is coupled to the side surfaces along at least a portion of the outer half of the airbag.

11. The airbag of claim 2, wherein the airbag includes an outer half that is closer to a vehicle seat than an inner half of the airbag and the tether is coupled to the side surfaces along at least a portion of the outer half of the airbag.

12. A variable volume airbag, comprising:
an inflatable cushion defining an inner volume in which a gas is received to inflate the cushion longitudinally toward a vehicle occupant, and laterally and vertically within a passenger compartment of a vehicle, the cushion having laterally opposed side surfaces, opposed upper and lower surfaces, and front and rear surfaces facing an occupant and defining part of the inner volume of the cushion; and
a tether coupled to each of the side surfaces of the cushion and having a first state wherein the tether limits lateral separation of the side surfaces and a second state wherein increased separation of the side surfaces is permitted as compared to the first state, the tether being coupled to the airbag closer to the front surface than the rear surface of the airbag, and closer to the upper surface than the lower surface.

13. The airbag of claim 12, wherein when the tether is in its first state the effective inner volume of the airbag is at least 15% less than the effective inner volume of the airbag when the tether is in its second state.

14. The airbag of claim 12, wherein when the tether is in its first state the effective inner volume of the airbag is up to 40% less than the effective inner volume of the airbag when the tether is in its second state.

15. A variable volume airbag, comprising:
an inflatable cushion defining an inner volume in which a gas is received to inflate the cushion longitudinally toward a vehicle occupant, and laterally and vertically within a passenger compartment of a vehicle, the cushion having laterally opposed side surfaces, opposed upper and lower surfaces, and front and rear surfaces facing an occupant and defining part of the inner volume of the cushion; and
a tether coupled to each of the side surfaces of the cushion and having a first state wherein the tether limits lateral separation of the side surfaces and a second state wherein increased separation of the side surfaces is permitted at the points of attachment of the side surfaces to the tether as compared to the first state, the tether being coupled to the airbag closer to the front surface than the rear surface of the airbag, and closer to the upper surface than the lower surface, wherein the tether includes a frangible connection feature that breaks when the tether is subjected to a force above a threshold to permit the tether to change from its first state to its second state.

16. The airbag of claim 15, wherein the connection feature includes one or more stitches in the tether.

17. The airbag of claim 16, wherein the stitches connect together two layers of material of the tether.

18. The airbag of claim 16, wherein the stitches connect together the tether and airbag.

19. The airbag of claim 15, wherein the connection feature is a seam formed between two layers of material of the tether.

* * * * *